United States Patent
Nishiguchi et al.

(10) Patent No.: US 8,488,082 B2
(45) Date of Patent: Jul. 16, 2013

(54) POLARIZING FILM AND METHOD FOR PRODUCING THE SAME

(75) Inventors: Kyoko Nishiguchi, Ibaraki (JP); Shoichi Matsuda, Ibaraki (JP); Tadayuki Kameyama, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 254 days.

(21) Appl. No.: 13/059,526

(22) PCT Filed: Apr. 9, 2009

(86) PCT No.: PCT/JP2009/057264
§ 371 (c)(1),
(2), (4) Date: Feb. 17, 2011

(87) PCT Pub. No.: WO2010/029789
PCT Pub. Date: Mar. 18, 2010

(65) Prior Publication Data
US 2011/0141430 A1    Jun. 16, 2011

(30) Foreign Application Priority Data
Sep. 12, 2008 (JP) .................................. 2008-234137

(51) Int. Cl.
*G02F 1/1335* (2006.01)
(52) U.S. Cl.
USPC ............................................................ 349/96

(58) Field of Classification Search
USPC ............................................................ 349/96
See application file for complete search history.

(56) References Cited

U.S. PATENT DOCUMENTS

| | | | |
|---|---|---|---|
| 8,189,165 B2* | 5/2012 | Umemoto et al. | 349/167 |
| 2003/0022002 A1* | 1/2003 | Penterman et al. | 428/431 |
| 2007/0146882 A1* | 6/2007 | Yoshioka et al. | 359/500 |
| 2008/0143928 A1* | 6/2008 | Fukagawa | 349/96 |
| 2008/0252974 A1* | 10/2008 | Futamura et al. | 359/490 |
| 2009/0040609 A1 | 2/2009 | Hasegawa et al. | |
| 2009/0068379 A1* | 3/2009 | Seki et al. | 428/1.1 |
| 2009/0275742 A1 | 11/2009 | Sano et al. | |
| 2010/0091222 A1* | 4/2010 | Swager | 349/88 |

FOREIGN PATENT DOCUMENTS

| | | |
|---|---|---|
| JP | 09-227855 A | 9/1997 |
| JP | 9-268279 A | 10/1997 |
| JP | 2006-323377 A | 11/2006 |
| JP | 2007-126628 A | 5/2007 |
| JP | 2009-104113 A | 5/2009 |
| WO | 2006/115206 A1 | 11/2006 |

OTHER PUBLICATIONS

International Search Report of PCT/JP2009/057264, date of mailing Jun. 9, 2009.

* cited by examiner

*Primary Examiner* — Timothy L Rude
(74) *Attorney, Agent, or Firm* — Westerman, Hattori, Daniels & Adrian, LLP

(57) ABSTRACT

There is provided a polarizing film exhibiting a stable and high dichroic ratio by forming a film using a water solution in which a metal capture agent has been added, even if multivalent metal cations are included.

7 Claims, 2 Drawing Sheets

Water evaporation

PRIOR ART

Water evaporation

POLARIZING FILM AND METHOD FOR PRODUCING THE SAME

TECHNICAL FIELD

The present invention relates to a polarizing film formed by casting a lyotropic liquid crystal compound and a method for producing the same.

DESCRIPTION OF THE RELATED ART

A lyotropic liquid crystal compound having an anionic group is conventionally known (For instance, Japanese Patent Application Unexamined Publication No. 2006-323377 A). The polarizing film obtained by casting a water solution containing such a compound is expected to have potential because it is possible to reduce the thickness of the polarizing film significantly compared to a polarizing film used widely, in which polyvinyl alcohol is dyed with iodine.

However, the conventional polarizing film obtained by casting a water solution containing a lyotropic liquid crystal compound may suffer a drop in dichroic ratio. Although it is considered that the drop in dichroic ratio occurs due to non-uniform orientation of the lyotropic liquid crystal compound, the cause has remained unknown.

SUMMARY OF THE INVENTION

It happened sometime that the conventional polarizing film obtained by casting a water solution containing a lyotropic liquid crystal compound suffered a drop in dichroic ratio. It is an object of the present invention to provide a polarizing film obtained by casting a water solution containing a lyotropic liquid crystal compound with a stable and high dichroic ratio and a method for producing thereof.

Inventors of the present invention carried out extensive investigations to solve this problem. As a result, they found out the cause of the drop in dichroic ratio in the conventional polarizing films is due to the inclusion of a multivalent metal cation as impurity in a water solution before forming a polarizing film. Examples of a multivalent metal cation includes ferric ion ($Fe^{2+}$, $Fe^{3+}$) and chrome-ion ($Cr^{3+}$). And these exist in minute amounts in tap water or a raw material of a lyotropic liquid crystal compound and then are mixed as impurities in the water solution before the formation of the polarizing film.

Therefore, they have found out that it is possible in the present invention to obtain a polarizing film exhibiting a stable and high dichroic ratio by forming a film using a water solution in which a metal capture agent has been added, even if a multivalent metal cation is included in the water solution. The reason for obtaining such a superior effect will now be described with reference to accompanying drawings.

FIG. 1 is a schematic view of a production process of a conventional polarizing film 10. Lyotropic liquid crystal compounds 12 face in random directions and are not oriented before moisture 11 is evaporated. Multivalent metal cations 13 randomly exist without being bound to the lyotropic liquid crystal compounds 12, either. When evaporating moisture 11, the multivalent metal cations 13 are bound to anionic groups (not shown in the figure) of the lyotropic liquid crystal compounds 12 in its process. The bound multivalent metal cations 13 enter among the lyotropic liquid crystal compounds 12 to block the orientation of the lyotropic liquid crystal compounds 12. This makes it impossible to fully orient the lyotropic liquid crystal compounds 12, resulting in a cause of a drop in dichroic ratio of the polarizing film 10.

FIG. 2 is a schematic view of a production process of a polarizing film 20 of the present invention. Lyotropic liquid crystal compounds 22 face in random directions and are not oriented before moisture 21 is evaporated. Both multivalent metal cations 23 and a metal capture agent 24 are randomly present. When evaporating moisture 21, the multivalent metal cations 23 are bound to the metal capture agent 24 to be phase-separated from the lyotropic liquid crystal compounds 22. It is, therefore, possible to fully orient the lyotropic liquid crystal compounds 22 without being blocked by the multivalent metal cations 23. This enables the polarizing film 20 of the present invention to have a stable and high dichroic ratio. The metal capture agent 24 bound to the multivalent metal cations 23 tends to be eccentrically-located in a surface vicinity 25 of the polarizing film 20.

The summary of the present invention is described as follows:

In a first preferred embodiment, a polarizing film according to the present invention comprises: a lyotropic liquid crystal compound having an anionic group; and a metal capture agent, wherein a metal capture agent-based phase is phase-separated from a lyotropic liquid crystal compound-based phase.

In a second preferred embodiment of the polarizing film according to the present invention, the metal capture agent based-phase is eccentrically-located at least near one surface of the polarizing film.

In a third preferred embodiment of the polarizing film according to the present invention, the lyotropic liquid crystal compound is an azo compound represented by the following general formula (1):

[Chemical formula 1]

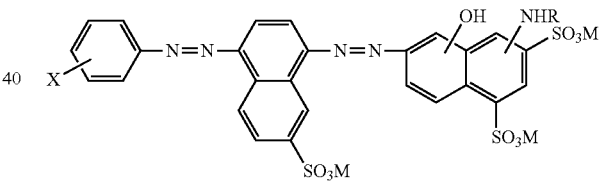

(1)

wherein R is a hydrogen atom, an alkyl group with 1 to 3 carbon atoms, an acetyl group, a benzoyl group or a phenyl group which may have any substituent groups. M is a hydrogen atom, an alkali metal atom or an alkaline-earth metal atom. X is a hydrogen atom, a halogen atom, a nitro group, a cyano group, an alkyl group with 1 to 4 carbon atoms, an alkoxy group with 1 to 4 carbon atoms or a —$SO_3M$ group.

In a fourth preferred embodiment of the polarizing film according to the present invention, the metal capture agent is composed of a water-soluble polymer including at least two kinds of electron-donating agents selected from the group consisting of nitrogen, sulfur, oxygen, and phosphorus.

In a fifth preferred embodiment of the polarizing film according to the present invention, the metal capture agent is an oxazoline-functional water-soluble polymer.

In a sixth preferred embodiment of the polarizing film according to the present invention, the metal capture agent captures ferric ion, chrome-ion or copper ion.

In a seventh preferred embodiment, a method for producing the aforementioned polarizing film according to the present invention comprises the steps of: forming a thin film by casting a water solution containing a lyotropic liquid crystal compound having an anionic group, a metal capture agent, and water; and forming a polarizing film by evaporating water in the thin film.

ADVANTAGE OF THE INVENTION

According to the present invention, it has become possible to materialize a polarizing film obtained by casting a water solution containing a lyotropic liquid crystal compound exhibiting a stable and high dichroic ratio.

DESCRIPTION OF THE PREFERRED EMBODIMENTS

[Polarizing Film]

A polarizing film of the present invention comprises: a lyotropic liquid crystal compound having an anionic group; and a metal capture agent, wherein a metal capture agent-based phase is phase-separated from a lyotropic liquid crystal compound-based phase. The metal capture agent-based phase may be eccentrically located only near one surface of the polarizing film, alternatively may be eccentrically located near surfaces of both sides of the polarizing film. Although in the polarizing film of the present invention, multivalent metal cations are included in a water solution as impurities before forming a film, the polarizing film exhibits a stable and high dichroic ratio free from any orientation failure during the formation of a film. Further, the term "-based" herein refers to a constituent component which accounts for at least 70% by weight of the phase.

The permissible amount of the multivalent metal cations contained in the water solution before forming a film and in the polarizing film after forming a film depends on the kind or the added amount of the metal capture agent, however, is typically over 0 and 1% by weight or lower. In the polarizing film after the formation of the film, it is preferable that the multivalent metal cations may be mostly included in the metal capture agent-based phase.

The polarizing film of the present invention preferably has a thickness of 0.1 to 5 µm, more preferably 0.1 to 3 µm. When the metal capture agent-based phase has a layer, a metal capture agent layer in the polarizing film preferably has a thickness of 0.005 to 0.5 µm.

The polarizing film of the present invention exhibits absorption dichroism at least at one wavelength in a visible light region (at a wavelength of 380 to 800 nm). The polarizing film of the present invention preferably has a dichroic ratio of 20 or higher. According to the present invention, it is possible to typically improve a dichroic ratio of the polarizing film by 20% or higher than conventional polarizing films which do not include a metal capture agent.

The polarizing film of the present invention may include any additives, as long as the polarizing film comprises a lyotropic liquid crystal compound having an anionic group and a metal capture agent. Examples of the additives include a surfactant, an antioxidant, and an orientation aid or the like. The content of the additives is preferably over 0 and 5% by weight or lower with respect to the total amount of the polarizing film. The aforementioned additives may be included in any one of the metal capture-based phase and the lyotropic liquid crystal compound-based phase without having substantive adverse effect on function effect of the present invention.

[Lyotropic Liquid Crystal Compound]

The lyotropic liquid crystal compound to be used in the present invention has an anionic group. Examples of an anionic group include a sulfonic acid group, a carboxyl group, a phosphate group, and a base thereof or the like. The number (substitution number) of anionic groups contained in the aforementioned lyotropic liquid crystal compound is preferably 2 to 4. In the lyotropic liquid crystal compound having anionic groups, it becomes easy to prepare a water solution because the anionic groups improve solubility to water.

Examples of such a lyotropic liquid crystal compound include a group of compounds listed in Japanese Patent Application Laid-Open Publication No. 2007-126628 A and Japanese Patent Application Laid-Open Publication No. 2006-323377A. Since such a lyotropic liquid crystal compound forms supramolecular aggregates in the solution, the longitudinal direction of the supramolecular aggregates is oriented in a flow direction when flowing the lyotropic liquid crystal compound by applying shearing force to the solution including these supramolecular aggregates.

The aforementioned lyotropic liquid crystal compound is preferably an azo compound represented by the general formula (1) below. Such an azo compound exhibits a stable liquid crystal phase and has superior orientation in a state of being dissolved in the solvent.

[Chemical formula 1]

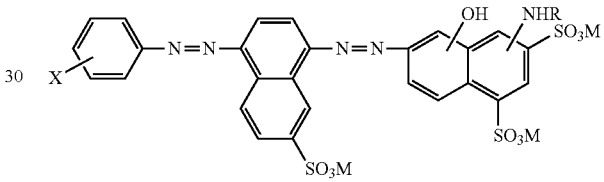

(1)

In which R is a hydrogen atom, an alkyl group with 1 to 3 carbon atoms, an acetyl group, a benzoyl group or a phenyl group that may have any substituent groups. M is a counter ion and is preferably a hydrogen atom, an alkali metal atom or an alkaline-earth metal atom. X is a hydrogen atom, a halogen atom, a nitro group, a cyano group, an alkyl group with 1 to 4 carbon atoms, an alkoxy group with 1 to 4 carbon atoms or a —SO$_3$M group.

It is possible to obtain the azo compound represented by the general formula (1) by diazotizing and coupling an aniline derivative and a naphthalene sulfonate derivative in accordance with a conventional method and the obtained monoazo compound is subject to diazotization and coupling reaction with an amino naphthol disulfonic acid derivative.

[Metal Capture Agent]

The metal capture agent to be used in the present invention is a compound having capability to form salt or complex salt. Examples of the aforementioned metal capture agent includes a group of compounds listed in Japanese Patent Application Laid-Open Publication No. 09-227855 A and Japanese Patent Application Laid-Open Publication No. 09-268279 A.

The aforementioned metal capture agent is preferably a water-soluble polymer including at least two kinds of electron-donating elements (Polymer chelating agents) selected from the group consisting of nitrogen, sulfur, oxygen, and phosphorus, is more preferably an oxazoline-functional water soluble polymer. The weight-average molecular weight of the aforementioned water-soluble polymer is usually 5,000 to 1,000,000.

The metal capture agent may be used in mixture of two kinds or more. Further, the metal capture agent may be used in mixture with other water-soluble polymers, such as polyvinyl alcohol and water-soluble cellulose or the like. In addition, the aforementioned polymer chelating agents are available in the market and it is possible to use marketed products as they are. A typically example of the marketed product includes "Epoflock" produced by Miyoshi Oil & Fat Co., Ltd.

The kinds of multivalent metal cations captured by the aforementioned metal capture agent are not particularly limited, but ferric ion, chrome-ion, and copper ion or the like are preferably captured to obtain a polarizing film with a high dichroic ratio. Such multivalent metal cations tend to block lyotropic liquid crystal compounds from being oriented, so that the multivalent metal cations are preferably separated from the lyotropic liquid crystal compounds and eccentrically located in a polarizing film.

The content of the aforementioned metal capture agent in the polarizing film depends on the kind of the multivalent metal cations or the content thereof, but is preferably 0.1 to 5 weight parts, more preferably 0.5 to 3 weight parts relative to 100 weight parts of the lyotropic liquid crystal compounds. When a plurality of metal capture agents are included in the content, the content means its total amount.

[Method for Producing Polarizing Film]

A method for producing a polarizing film of the present invention comprises the steps of: forming a thin film by casting a water solution which comprises a lyotropic liquid crystal compound having an anionic group, a metal capture agent, and water; and forming a polarizing film by evaporating water in the thin film. The production method of the present invention may include the other steps, as long as the method includes the aforementioned steps.

The water solution to be used in the present invention comprises: a lyotropic liquid crystal compound having an anionic group; a metal capture agent; and water. The lyotropic liquid crystal compound in this water solution preferably has a concentration of 5 to 50% by weight. Although high-purity water is generally preferable, water containing multivalent metal cations as impurities (for example, tap water) may be used because a metal capture agent is used in the present invention. Accordingly, it is possible to expect a reduction in production costs of the polarizing film because purification of water is not required or less purification of water is required.

The casting method to be used in the present invention is not particularly limited, but typically includes a method for coating a water solution on a substrate or a method for developing a water solution on a metal drum and the like. The thin film obtained by casting the aforementioned water solution contains moisture. The moisture content in the thin film is 50 to 100% by weight when the moisture content in the water solution is 100% by weight.

Any means, such as natural drying, reduced-pressure drying, and drying by heating or the like may be used as drying means in the present invention. In the present invention, as shown in FIG. 2, it is presumed that a metal capture agent is bound to multivalent metal cations which are impurities and then are phase-separated from lyotropic liquid crystal compounds at the stage of evaporating moisture. This makes it possible to prevent the lyotropic liquid crystal compounds from orientation failure, so that the obtained polarizing film exhibits a high dichroic ratio. The aforementioned polarizing film is preferably dried in such a manner that the residual amount of moisture may be preferably 35% by weight or lower relative to the total weight of the polarizing film.

[Applications of Polarizing Film]

The polarizing film of the present invention is preferably used as a polarizer. The polarizer is applied to liquid crystal display apparatuses, such as liquid crystal television units, liquid crystal displays, mobile phones, digital cameras, portable game devices, video cameras, car navigation systems, copy machines, facsimile machines, and watches or the like.

EXAMPLES

The present invention will be more clearly understood by referring to the Examples below. However, the Examples should not be construed to limit the invention in any way.

Example 1

In accordance with a conventional method ("Riron Seizo Senryo Kagaku" Fifth Edition (Theoretical production Dye Chemistry), Yutaka Hosoda (published on Jul. 15, 1968, GIHODO SHUPPAN Co., Ltd.), pages 135 to 152), a monoazo compound was produced by diazotizing and coupling 4-nitroaniline and 8-amino-2-naphthalene sulfonic acid. The obtained monoazo compound was diazotized by a conventional method in the same manner and was further subject to coupling reaction with 1-amino-8-naphthol-2,4-disulfonate lithium salt to obtain a rough product including an azo compound having the following structural formula (2) and salting out was carried out with lithium chloride to obtain an azo compound having the structural formula (2) below. This azo compound exhibited a nematic liquid crystal phase at 20% by weight when sampling a small amount of this azo compound and observing with a polarizing microscope after dissolving in water at various temperatures.

[Chemical formula 2]

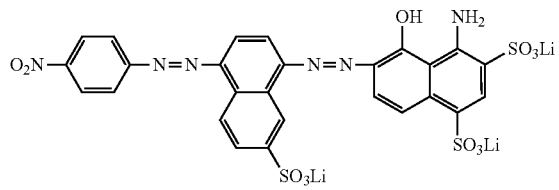

(2)

The azo compound of the aforementioned structural formula (2) and an oxazoline-functional water-soluble polymer (manufactured by Nippon Shokubai Co., Ltd., product name: "Epocros WS-700") were dissolved in ion-exchange water to prepare a water solution having a concentration of the azo compound of 5% by weight. This water solution contained 1 weight part of an oxazoline-functional water-soluble polymer relative to 100 weight parts of the azo compound. Further the water solution contains 2,300 weight ppm of ferric ion and 760 weight ppm of chrome-ion on the basis of the total weight of the azo compound (The concentration of the aforementioned ferric ion is a total concentration obtained by summing each concentration in different valences of ferric ion and the concentration of the aforementioned chrome-ion is a total concentration obtained by summing each concentration in different valences of chrome-ion).

The water solution was coated on a norbornene-based polymer film (produced by Nippon Zeon Co., Ltd., product name "Zeonor") with rubbing treatment and corona treatment using a bar coater (produced by BUSCHMAN, product name "Mayerrot HS4") to form a polarizing film with a thickness of 0.4 μm on a surface of the norbornene-based polymer film by natural drying in a temperature-controlled room at 23° C.

The polarizing film has a phase separation structure between an oriented layer of the azo compound and an oxazoline-functional water-soluble polymer layer. The oxazoline-functional water-soluble polymer layer was eccentrically located near the surface of the opposite side (air interface side) of the norbornene-based polymer film and was observed to contain ferric ion and chrome-ion. Little ferric ion and chrome-ion were contained in the oriented layer of the azo compound. Table 1 shows the dichroic ratio of this polarizing film.

Example 2

A polarizing film was prepared in the same manner as in Example 1 except for the use of a polymer chelating agent containing a dithiocarbamic acid-based compound as substitute for an oxazoline-functional water-soluble polymer. The dichroic ratio of the obtained polarizing film is shown in Table 1.

Comparative Example

A polarizing film was prepared in the same manner as in Example 1 except that an oxazoline-functional water-soluble polymer was not used. The dichroic ratio of the obtained polarizing film is shown in Table 1.

TABLE 1

| | Metal capture agent | | |
| --- | --- | --- | --- |
| | Kind | Additive amount with respect to 100 weight parts of an azo compound (unit: weight parts) | Polarizing film Dichroic ratio |
| Example 1 | Oxazoline-functional water-soluble polymer | 1 | 27.8 |
| Example 2 | Polymer chelating agent containing a dithiocarbamic acid-based compound | 1 | 23.7 |
| Comparative Example | None | 0 | 18.8 |

[Measurement Method]
[Observation of Liquid Crystal Phase]

A small amount of a coating solution was sandwiched by two pieces of slid glasses to observe using a polarization microscope (manufactured by OLYMPUS CORPORATION, product name: "OPTIPHOT-POL").
[Measurement of Thickness]

A portion of a polarizing film was released to obtain the thickness of the polarizing film by measuring the level difference using a three-dimensional measurement system of the shape of a non-contact surface (manufactured by Ryoka Systems, Inc., product name: "MM5200").
[Measurement of Ferric Ion, Chrome-Ion]

100 mg of a sample solid content was decomposed by pressurized acid and then ultrapure water was added to a decomposition product to use a sample solution adjusted to 25 ml to be prepared. A concentration of the sample solution was measured using an inductive-coupled plasma mass spectrometer (manufactured by PERKINELMER CO., LTD., product name: "ELAN DRC2"). The concentration of ferric ion and chrome-ion obtained by this analysis is a total concentration which includes different valences.
[Confirmation of Distribution Position of Water-Soluble Compound]

A polarizing film was obliquely machined with respect to a main surface by a precision cutter (manufactured by MEKONG COMPANY) to confirm a cutter surface using a TOF-SIMS ("TOF-SIMS5" manufactured by ION-TOF Corporation). Measuring conditions were primary ion accelerating voltage=25 kv and the measurement range was 250 µm×250 µm.
[Measurement of Dichroic Ratio]

Measuring light of linear polarization was allowed to enter using a spectrophotometer with Glan-Thompson polarizer (produced by JASCO Corporation, product name: U-4100). And $k_1$ and $k_2$ of Y value whose visibility has been corrected were obtained to obtain the dichroic ratio from the following equation:

$$\text{Dichroic ratio} = \log(1/k_2)/\log(1/k_1)$$

wherein $k_1$ is a transmittance of a linear polarization in a maximum transmittance direction and a transmittance $k_2$ is a transmittance of a linear polarization in a direction that is perpendicular to the maximum transmittance direction.

DESCRIPTION OF THE SYMBOLS

Figure 1:
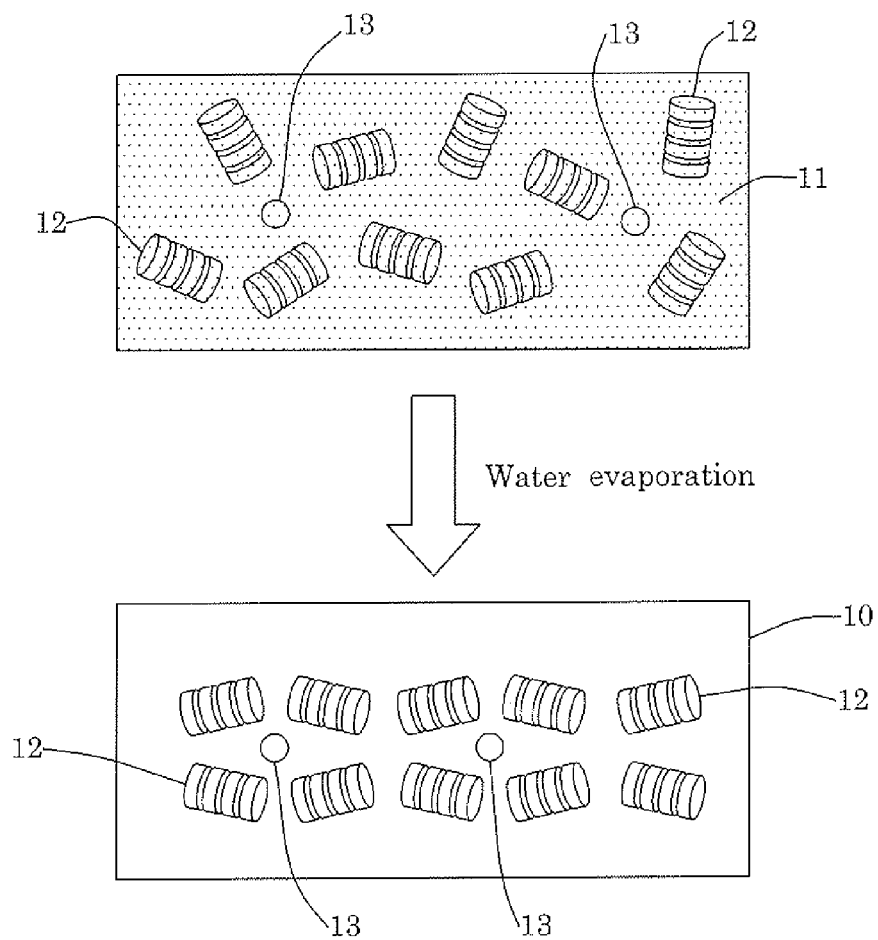
FIG. 1 is a schematic view of a production process of a conventional polarizing film.
Figure 2:
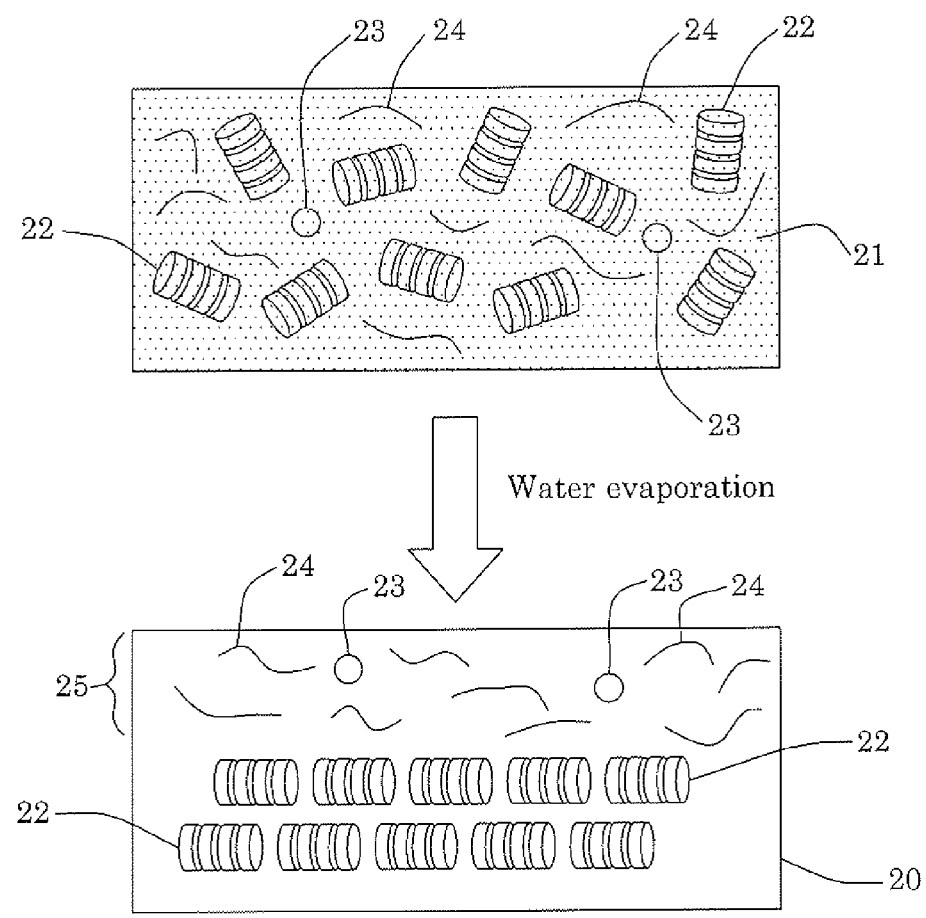
FIG. 2 is a schematic view of a production process of a polarizing film of the present invention.

10: Polarizing film; 11: moisture; 12: lyotropic liquid crystal compound; 13: multivalent metal cation; 20: polarizing film; 21: moisture; 22: lyotropic liquid crystal compound; 23: multivalent metal cation; 24: metal capture agent; 25: surface vicinity of polarizing film.

What is claimed is:

1. A polarizing film comprising:
    a lyotropic liquid crystal compound having an anionic group; and
    a metal capture agent,
wherein a metal capture agent-based phase is phase-separated from a lyotropic liquid crystal compound-based phase.

2. The polarizing film according to claim 1, wherein the metal capture agent-based phase is eccentrically-located at least near one surface of the polarizing film.

3. The polarizing film according to claim 1, wherein the lyotropic liquid crystal compound is an azo compound represented by the following general formula (1):

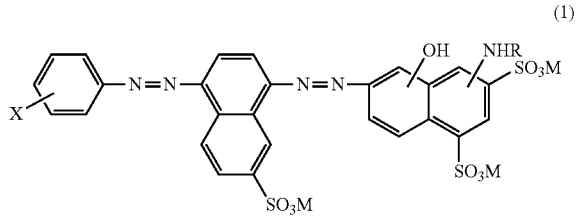 (1)

wherein R is a hydrogen atom, an alkyl group with 1 to 3 carbon atoms, an acetyl group, a benzoyl group or a phenyl group which has any substituent groups, M is a hydrogen atom, an alkali metal atom or an alkaline-earth metal atom, and X is a hydrogen atom, a halogen atom, a nitro group, a cyano group, an alkyl group with 1 to 4 carbon atoms, an alkoxy group with 1 to 4 carbon atoms or a —SO$_3$M group.

4. The polarizing film according to claim 1, wherein the metal capture agent is composed of a water-soluble polymer including at least two kinds of electron-donating agents selected from the group consisting of nitrogen, sulfur, oxygen, and phosphorus.

5. The polarizing film according to claim 1, wherein the metal capture agent is an oxazoline-functional water-soluble polymer.

6. The polarizing film according to claim 1, wherein the metal capture agent captures ferric ion, chrome-ion or copper ion.

7. A method for producing the polarizing film according to any one of claims 1 to 6, comprising the steps of:
   forming a thin film by casting a water solution containing a lyotropic liquid crystal compound having an anionic group, a metal capture agent, and water; and
   forming a polarizing film by evaporating water in the thin film.

* * * * *